United States Patent
Takahashi et al.

(10) Patent No.: US 10,518,498 B2
(45) Date of Patent: Dec. 31, 2019

(54) PACKAGING BAG, AND METHOD USING SAME FOR STORING POLYVINYL ALCOHOL-BASED RESIN THAT CONTAINS MODIFIED GROUP HAVING ACTIVE HYDROGEN

(71) Applicant: THE NIPPON SYNTHETIC CHEMICAL INDUSTRY CO., LTD., Osaka (JP)

(72) Inventors: Hirosato Takahashi, Osaka (JP); Yukitoshi Nishikawa, Osaka (JP); Tomoyuki Fujii, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 99 days.

(21) Appl. No.: 15/512,654

(22) PCT Filed: Sep. 28, 2015

(86) PCT No.: PCT/JP2015/077399
§ 371 (c)(1),
(2) Date: Mar. 20, 2017

(87) PCT Pub. No.: WO2016/052446
PCT Pub. Date: Apr. 7, 2016

(65) Prior Publication Data
US 2017/0283142 A1 Oct. 5, 2017

(30) Foreign Application Priority Data
Sep. 30, 2014 (JP) .................... 2014-200757

(51) Int. Cl.
| | | |
|---|---|---|
| *B32B 1/02* | (2006.01) | |
| *B32B 27/32* | (2006.01) | |
| *B65D 65/40* | (2006.01) | |
| *B65D 81/24* | (2006.01) | |
| *B32B 15/088* | (2006.01) | |
| *B32B 15/085* | (2006.01) | |
| *B32B 15/09* | (2006.01) | |
| *B65D 65/42* | (2006.01) | |
| *B32B 15/082* | (2006.01) | |
| *B32B 15/20* | (2006.01) | |
| *B32B 27/30* | (2006.01) | |
| *B32B 15/08* | (2006.01) | |
| *B32B 27/06* | (2006.01) | |
| *B32B 27/08* | (2006.01) | |
| *B32B 27/10* | (2006.01) | |
| *B32B 27/34* | (2006.01) | |
| *B32B 27/36* | (2006.01) | |
| *B32B 29/00* | (2006.01) | |

(52) U.S. Cl.
CPC ............... *B32B 1/02* (2013.01); *B32B 15/08* (2013.01); *B32B 15/082* (2013.01); *B32B 15/085* (2013.01); *B32B 15/088* (2013.01); *B32B 15/09* (2013.01); *B32B 15/20* (2013.01); *B32B 27/06* (2013.01); *B32B 27/08* (2013.01); *B32B 27/10* (2013.01); *B32B 27/306* (2013.01); *B32B 27/32* (2013.01); *B32B 27/34* (2013.01); *B32B 27/36* (2013.01); *B32B 29/002* (2013.01); *B65D 65/40* (2013.01); *B65D 65/42* (2013.01); *B65D 81/24* (2013.01); *B32B 2307/31* (2013.01); *B32B 2307/7246* (2013.01); *B32B 2309/105* (2013.01); *B32B 2439/00* (2013.01); *B32B 2439/46* (2013.01)

(58) Field of Classification Search
CPC ......... B32B 1/02; B32B 15/08; B32B 15/082; B32B 15/085; B32B 15/088; B32B 15/09; B32B 27/08; B32B 27/30; B32B 27/306; B32B 27/32; B32B 27/325; B32B 27/327; B32B 27/36; B65D 65/40; B65D 65/42; B65D 81/24; B65D 88/16
See application file for complete search history.

(56) References Cited

U.S. PATENT DOCUMENTS

| | | | |
|---|---|---|---|
| 6,558,764 B2 | 5/2003 | Blom et al. | |
| 2002/0009562 A1* | 1/2002 | Blom | B65D 88/16 |
| | | | 428/35.7 |

(Continued)

FOREIGN PATENT DOCUMENTS

| | | |
|---|---|---|
| AU | 2008319934 A | 10/2008 |
| EP | 3064515 A | 9/2016 |

(Continued)

OTHER PUBLICATIONS

Supplemental European Search Report in respect to European Patent Application No. 15845732.5, dated Feb. 5, 2018.

(Continued)

*Primary Examiner* — Walter Aughenbaugh
(74) *Attorney, Agent, or Firm* — Greenblum & Bernstein, P.L.C.

(57) ABSTRACT

A packaging bag for packaging a polyvinyl alcohol-based resin that contains a modified group having active hydrogen, the packaging bag including a film having a water vapor permeability of 10 $g/m^2$/day or less. Accordingly, when a polyvinyl alcohol-based resin that contains a modified group having active hydrogen is packaged with the packaging bag, the storage stability of the polyvinyl alcohol-based resin that contains a modified group having active hydrogen can be improved, and hence an aqueous solution of the polyvinyl alcohol-based resin that contains a modified group having active hydrogen, the solution being reduced in insoluble matter content, can be obtained even after long-term storage thereof.

18 Claims, No Drawings

(56) References Cited

U.S. PATENT DOCUMENTS

| | | | | |
|---|---|---|---|---|
| 2007/0135616 A1* | 6/2007 | Murata | ............... | C08G 59/04 |
| | | | | 528/480 |
| 2008/0069726 A1* | 3/2008 | Nakagawa | ............ | H01M 8/241 |
| | | | | 422/40 |
| 2008/0262179 A1* | 10/2008 | Nakamura | ............ | C08F 220/06 |
| | | | | 526/241 |
| 2009/0253865 A1* | 10/2009 | Shibutani | ............... | B41M 5/44 |
| | | | | 525/59 |
| 2010/0015431 A1* | 1/2010 | Matsui | .............. | B29C 66/72324 |
| | | | | 428/323 |

FOREIGN PATENT DOCUMENTS

| | | |
|---|---|---|
| EP | 3176105 A | 6/2017 |
| JP | 2002-538054 | 11/2002 |
| JP | 2005-306483 | 11/2005 |
| JP | 2007-84802 | 4/2007 |
| JP | 2010-168500 A | 8/2010 |
| JP | 2013-028697 | 2/2013 |
| JP | 2013-202941 | 10/2013 |
| JP | 2013-227073 | 11/2013 |

OTHER PUBLICATIONS

Search Report issued in PCT/JP2015/077399, dated Dec. 22, 2015 in English.
International Preliminary Report on Patentability issued in PCT/JP2015/077399, dated Dec. 22, 2015 in English.
Chinese Office Action dated Apr. 3, 2019 in corresponding Chinese Application No. 201580046945.X.

* cited by examiner

PACKAGING BAG, AND METHOD USING SAME FOR STORING POLYVINYL ALCOHOL-BASED RESIN THAT CONTAINS MODIFIED GROUP HAVING ACTIVE HYDROGEN

TECHNICAL FIELD

The present disclosure relates to a packaging bag for packaging a polyvinyl alcohol-based resin that contains a modified group having active hydrogen and a method of storing a polyvinyl alcohol-based resin that contains a modified group having active hydrogen with the packaging bag, and more specifically, to a packaging bag excellent in storage stability of a polyvinyl alcohol-based resin that contains a modified group having active hydrogen.

BACKGROUND ART

A polyvinyl alcohol (hereinafter sometimes referred to as "PVA")-based resin is a water-soluble resin and has moisture absorbability. The PVA-based resin is typically stored and distributed in the state of a solid (e.g., powder or a granule). However, even in the case where the resin absorbs moisture in the course of its storage or distribution, when the resin is used, the resin is dissolved in water and used as an aqueous solution. Accordingly, the moisture absorption itself has not been perceived as a problem. That is, when the PVA-based resin absorbs moisture, blocking may occur, but the dissolution of the resin in water eliminates the blocking. Accordingly, only the prevention of water leakage is considered in a packaging bag to be used at the time of the sealing of the PVA-based resin, and hence a packaging bag made of polyethylene terephthalate has heretofore been used.

Such packaging bag is applied not only to an unmodified PVA-based resin but also to various modified PVA-based resins, and has been used for, for example, a PVA-based resin that contains a modified group having active hydrogen. The bag has been similarly used in the case of an acetoacetyl group-containing polyvinyl alcohol-based resin (hereinafter sometimes referred to as "acetoacetylated PVA-based resin") disclosed in Patent Literature 1 that has high reactivity with a crosslinking agent and hence has been developed into various applications, or a polyvinyl alcohol-based resin containing a diacetone acrylamide structural unit (hereinafter referred to as "diacetone acrylamidated PVA-based resin") disclosed in Patent Literature 2.

RELATED ART

PTL 1: JP-A-2013-028697
PTL 2: JP-A-2013-202941

SUMMARY OF INVENTION

A PVA-based resin that contains a modified group having active hydrogen has active hydrogen rich in reactivity, and such active hydrogen refers to, for example, a proton on a methylene group having increased acidity like hydrogen of a methylene group adjacent to a carbonyl group. Therefore, when a time period elapses from the production of the resin, a crosslinking reaction is caused in a resonance-stabilized portion by such proton to produce a crosslinked product. Accordingly, there occurs a problem in that when the resin is turned into an aqueous solution, an insoluble matter (dissolution residue) occurs to make it difficult to develop the resin into various applications.

Accordingly, the present disclosure has been made in view of such circumstances, and an object is to provide a packaging bag that can suppress the production of an insoluble matter at the time of the packaging of a PVA-based resin that contains a modified group having active hydrogen to achieve an improvement in storage stability thereof, and a method of storing a PVA-based resin that contains a modified group having active hydrogen with the packaging bag.

The inventors have made extensive investigations in view of the circumstances. In the course of the investigations, the inventors have departed from the conventional technical spirit in which only the prevention of water leakage is considered, and have made an investigation with a view to suppressing the production of a crosslinked product serving as a cause for the problem. In the course of the investigation, the inventors have considered that the production of the crosslinked product is a result of the occurrence of a crosslinking reaction due to the facilitation of the movement of a molecule by the absorption of humidity (moisture) in air by the PVA-based resin that contains a modified group having active hydrogen. In addition, the inventors have made further investigations on the basis of the foregoing, and as a result, have found that when a packaging bag formed of a film that hardly transmits water vapor is used as a packaging bag to be used at the time of the hermetic sealing and packaging of the PVA-based resin that contains a modified group having active hydrogen, the absorption of the humidity (moisture) in the air is suppressed and hence the problem is solved. Thus, the inventors have completed the present disclosure.

Aspects of the Present Disclosure

That is, according to a first aspect, there is provided a packaging bag for packaging a PVA-based resin that contains a modified group having active hydrogen, the packaging bag including a film having a water vapor permeability of 10 $g/m^2/day$ or less.

According to a second aspect, there is provided a method of storing a PVA-based resin that contains a modified group having active hydrogen, the method including hermetically sealing and packaging a particulate matter of the PVA-based resin that contains a modified group having active hydrogen with a packaging bag including a film having a water vapor permeability of 10 $g/m^2/day$ or less.

When the PVA-based resin that contains a modified group having active hydrogen is packaged with the packaging bag, the storage stability of the PVA-based resin that contains a modified group having active hydrogen can be improved, and hence an aqueous solution of the PVA-based resin that contains a modified group having active hydrogen, the solution being reduced in insoluble matter content, can be obtained even after long-term storage thereof.

DESCRIPTION OF EMBODIMENTS

The description of a constituent feature to be described below is an example (typical example) of an embodiment of the present disclosure, and the present disclosure is not limited to the contents of the description.

The present disclosure is described below in detail.

A packaging bag is used at the time of the hermetic sealing and packaging of a PVA-based resin that contains a modified group having active hydrogen, and the bag includes a film having the following property: the water vapor permeability of the film is 10 $g/m^2/day$ or less.

First, such packaging bag is described in detail.

The packaging bag may be a bag including a single-layer structural body (single-layer film) or may be a bag including a multilayer structural body (multilayer structure film), and a film forming any such structural body has the following property: the water vapor permeability of the film is 10 g/m²/day or less.

The water vapor permeability is a value measured in conformity with JIS Z 0208 under the conditions of 40° C. and 90% RH. In the present disclosure, such water vapor permeability is desirably as small as possible.

With regard to the construction of the packaging bag, in the case of a single-layer structure, the bag typically includes only a water vapor barrier layer, and in the case of a multilayer structure, the bag typically adopts the following construction as a basic construction: a construction formed of a substrate film layer and the water vapor barrier layer, preferably a construction formed of the substrate film layer, the water vapor barrier layer, and a protective film layer obtained by further stacking the protective film layer.

Each layer is described below.

The water vapor permeability of the water vapor barrier layer of the present disclosure is typically from 0 g/m²/day to 10 g/m²/day, preferably from 0 g/m²/day to 3 g/m²/day, particularly preferably from 0 g/m²/day to 2 g/m²/day. When such value is excessively large, the effects of the present disclosure are not obtained.

In addition, the thickness of the water vapor barrier layer is typically from 1 μm to 200 μm, preferably from 2 μm to 100 μm, particularly preferably from 3 μm to 50 μm, more preferably from 3 μm to 10 μm. When such thickness is excessively small, the water vapor barrier property (gas barrier property) of the layer tends to reduce, and when the thickness is excessively large, cost tends to increase or the flexibility thereof tends to reduce. The water vapor permeability of the water vapor barrier layer having a thickness of 1 μm is typically 10 g/m²·μm/day or less, preferably 5 g/m²·μm/day or less, particularly preferably 1 g/m²·μm/day or less. A lower limit value therefor is typically 0.

In addition, a water vapor barrier layer-forming material to be used is typically, for example, metal foil, a metal-deposited film, or a water vapor barrier resin film. Examples of the metal foil include aluminum foil, gold foil, copper foil, stainless steel foil, permalloy foil, iron foil, titanium foil, tungsten foil, and tin foil. Examples of the metal-deposited film include an aluminum-deposited film, a gold-deposited film, a platinum-deposited film, a copper-deposited film, and a silica-deposited film. Examples of the water vapor barrier resin film include high-density polyethylene, medium-density polyethylene, low-density polyethylene, polypropylene, and polyester. Of those, metal foil or a metal-deposited film is preferred in terms of a barrier property, and metal foil, especially aluminum foil is particularly preferred. In addition, when the metal-deposited film is used, the aluminum-deposited film is most preferred in terms of economic efficiency and a barrier property. Further, when the water vapor barrier resin film is used, the low-density polyethylene is preferably used in terms of flexibility and a water vapor barrier property.

In the present disclosure, the low-density polyethylene refers to a polyethylene having an average density of from 0.910 g/cm³ to 0.925 g/cm³, the medium-density polyethylene refers to a polyethylene having an average density of from 0.926 g/cm³ to 0.940 g/cm³, and the high-density polyethylene refers to a polyethylene having an average density of 0.941 g/cm³ or more.

In addition, in the metal-deposited film, a film substrate onto which a metal is deposited is, for example, polyethylene terephthalate, nylon, polypropylene, polyvinyl chloride, triacetylcellulose, or PVA. Of those, polyethylene terephthalate is preferred in terms of deposition adhesiveness.

When a metal foil is used as the water vapor barrier layer, a known lamination method, such as dry lamination, non-solvent lamination, or extrusion lamination, may be used as a method of forming the layer.

In addition, when a metal-deposited film is used as the layer, a method of forming the layer is, for example, a vacuum deposition method, a sputtering method, or an ion plating method. Of those, a vacuum deposition method is preferably used.

The water vapor barrier layer-forming material may be a single layer, or may be a multilayer film obtained by stacking films identical to each other, or two or more kinds of films different from each other. Therefore, when the water vapor barrier layer is formed of a single layer, the thickness of the water vapor barrier layer refers to the thickness of the single layer, and when the layer is formed of a plurality of layers, the thickness refers to the total thickness of the plurality of layers.

A film for forming the substrate film layer is, for example, a polyester-based film, a polyolefin-based film, a polyamide-based film, a polyether-based film, or a polyurethane-based film. Of those, a polyamide-based film is particularly preferred. Examples of the polyamide-based film include respective films of nylon 11, nylon 12, nylon 6, nylon 66, and nylon 6•66. Of those, a polyolefin-based film and a polyamide-based film are preferred, and a polyamide-based film and a low-density polyethylene film are particularly preferred.

The substrate film layer may serve as a water vapor barrier layer, and in this case, the total of the thickness of the substrate film layer and the thickness of the water vapor barrier layer is defined as the thickness of the water vapor barrier layer.

The substrate film layer may be a single layer, or may be a multilayer film layer obtained by stacking two or more kinds of films different from each other.

The thickness of such substrate film layer is typically from 1 μm to 100 μm, preferably from 5 μm to 50 μm, particularly preferably from 10 μm to 30 μm. When such thickness is excessively small, the strength of the layer may reduce to cause a pin hole, and when the thickness is excessively large, cost tends to increase.

In addition, a material for forming the protective film layer is, for example, a polyester-based film, a polyolefin-based film, a polyamide-based film, a polyether-based film, or a polyurethane-based film as in the substrate film layer. Of those, a polyamide-based film is particularly preferred. Examples of the polyamide-based film include respective films of nylon 11, nylon 12, nylon 6, nylon 66, and nylon 6•66. In addition, the polyester-based film, especially polyethylene terephthalate is preferred.

The protective film layer may serve as a water vapor barrier layer, and in this case, the total of the thickness of the protective film layer and the thickness of the water vapor barrier layer is defined as the thickness of the water vapor barrier layer.

The protective film layer may be a single layer, or may be a multilayer film layer obtained by stacking two or more kinds of films different from each other.

The thickness of such protective film layer is typically from 5 μm to 200 μm, preferably from 20 μm to 100 μm, particularly preferably from 30 μm to 80 μm. When such thickness is excessively small, the strength of the layer tends to reduce to cause a pin hole, and when the thickness is excessively large, cost tends to increase.

In addition, the total thickness of the packaging bag is typically from 10 μm to 450 μm, preferably from 20 μm to 300 μm, particularly preferably from 25 μm to 200 μm in consideration of, for example, cost, strength, and a form of use. When such total thickness is excessively small, the strength of the bag tends to reduce, and when the thickness is excessively large, the following tendency is observed: it takes a long time period to perform, for example, heat sealing and hence efficiency reduces.

The packaging bag may be produced by, for example, preparing two sheet-like films (of single-layer structures or multilayer structures) each having the above-mentioned specific physical properties, and heat-sealing the remaining three sides while leaving one side serving as an opening portion. In addition, the production method is not limited thereto, and for example, the packaging bag may be produced by heat-sealing the remaining two sides while leaving one side serving as an opening portion, or the packaging bag may be produced by preparing one sheet-like film, and heat-sealing the remaining two sides while leaving one side serving as a folded opening portion.

The packaging bag is required to have strength at the time of its transportation. Accordingly, in the case of a packaging bag of a single-layer structure formed only of the water vapor barrier layer, the bag is typically packaged with a bag made of paper positioned outside the water vapor barrier layer, and in the case of a packaging bag formed of a multilayer structure including the substrate film layer, the water vapor barrier layer, and the protective film layer in the stated order from its inner side to its outer side, the bag is typically packaged with the bag made of paper positioned outside the protective film layer. Such paper only needs to have strength enough to endure the transportation, and kraft paper is typically used. The thickness of such kraft paper is typically from 10 μm to 1,000 μm, preferably from 50 μm to 500 μm, particularly preferably from 70 μm to 200 μm. When the thickness of the kraft paper is excessively small, its strength tends to be insufficient and hence cause the break of the paper, and when the thickness is excessively large, the paper tends to be heavy and hence unsuitable for the transportation.

PVA-Based Resin that Contains Modified Group Having Active Hydrogen

First, the PVA-based resin that contains a modified group having active hydrogen (hereinafter referred to as "active hydrogen-containing PVA-based resin") to be used in the present disclosure is described.

The term "active hydrogen" as used in the present disclosure refers to, for example, a proton on a methylene group having increased acidity like hydrogen of a methylene group adjacent to a carbonyl group. A crosslinking reaction is caused in a resonance-stabilized portion by such proton.

Such active hydrogen-containing PVA-based resin as described above is a PVA-based resin having a modified group, such as a ketone, a carboxylic acid, or a carboxylic acid ester having active hydrogen, and is specifically, for example, a PVA-based resin having an acetoacetyl group or a diacetone group. Of those, an acetoacetylated PVA-based resin or a diacetone acrylamidated PVA-based resin is preferred, and an acetoacetylated PVA-based resin is more preferred in terms of water resistance.

The average polymerization degree (in conformity with JIS K 6726) of the active hydrogen-containing PVA-based resin to be used in the present disclosure, which only needs to be appropriately selected in accordance with its applications, is typically from 200 to 4,000, and a resin having an average polymerization degree of from 400 to 3,500 is particularly used.

In addition, the viscosity of a 4 wt % aqueous solution of the active hydrogen-containing PVA-based resin is typically from 1.5 mPa·s to 100 mPa·s, preferably from 4 mPa·s to 80 mPa·s, more preferably from 5 mPa·s to 70 mPa·s.

In the present disclosure, the viscosity of the 4 wt % aqueous solution of the active hydrogen-containing PVA-based resin is a viscosity at 20° C. measured in conformity with JIS K 6726.

In addition, the saponification degree of the active hydrogen-containing PVA-based resin to be used in the present disclosure is typically from 80 mol % to 100 mol %, and a resin having a saponification degree of preferably from 85 mol % to 99.9 mol %, particularly preferably from 90 mol % to 99.8 mol % is used.

In the present disclosure, the saponification degree of the active hydrogen-containing PVA-based resin is measured in conformity with JIS K 6726.

The shape of the active hydrogen-containing PVA-based resin is typically, for example, powder, a granule, or a pellet, and the powder or the granule that easily dissolves in water is preferred. In addition, the average particle diameter of the active hydrogen-containing PVA-based resin is typically from 100 μm to 1,000 μm, preferably from 150 μm to 500 μm, particularly preferably from 200 μm to 400 μm. When the average particle diameter is excessively small, it tends to be difficult to handle the resin owing to, for example, its scattering, and when the average particle diameter is excessively large, a post-reaction occurs and hence a reaction tends to be nonuniform in the case of the modification of the resin.

The average particle diameter is measured by sieving, and the particle diameter at which the cumulative value of a particle size distribution becomes 50 wt % is defined as the average particle diameter.

The active hydrogen-containing PVA-based resin after its production typically contains small amounts of an alcohol and moisture. That is, the alcohol is, for example, methanol or ethanol used in the washing or saponification of the resin, and in ordinary cases, the resin contains a certain amount of the alcohol and water is present in a small amount in the resin. The content of such alcohol is typically from 0.1 wt % to 10 wt %. In addition, a moisture amount is typically 5 wt % or less, preferably 3 wt % or less. In the case where such moisture amount is excessively large, the following tendency is observed: even when moisture is blocked with the water vapor barrier layer, the effects of the present application are not obtained.

In addition, the content of the active hydrogen group-containing modified group in the active hydrogen-containing PVA-based resin is typically from 0.1 mol % to 20 mol %, and a resin having a content of such group of preferably from 0.2 mol % to 15 mol %, particularly preferably from 0.3 mol % to 10 mol % is generally widely used.

Acetoacetylated PVA-Based Resin

Next, the acetoacetylated PVA-based resin to be preferably used in the present disclosure is described. The acetoacetylated PVA-based resin is obtained by bonding an acetoacetyl group (AA group) to the main chain of a PVA-based resin directly or through an oxygen atom or a linking group, and is, for example, a PVA-based resin containing a structural unit having an AA group represented by the following general formula (1). Examples of the linking group include an alkylene chain having 1 to 6 carbon atoms, $-(CH_2O)_m-$, $-(OCH_2)_m-$, $-(CH_2O)_mCH_2-$, $-CO-$, $-COCO-$, and $-CO(CH_2)_mCO-$ (where m represents an integer of from 1 to 20).

Such acetoacetylated PVA-based resin has a vinyl alcohol structural unit in addition to the structural unit having an AA group, and may further have a vinyl ester structural unit of an unsaponified portion.

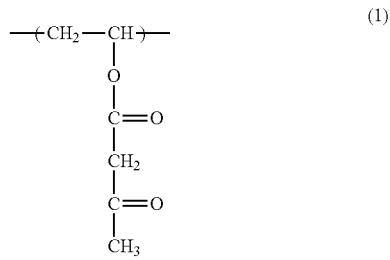

(1)

The average polymerization degree (in conformity with JIS K 6726) of the acetoacetylated PVA-based resin to be used in the present disclosure, which only needs to be appropriately selected in accordance with its applications, is typically from 200 to 4,000, and a resin having an average polymerization degree of from 400 to 3,500 is particularly used.

In addition, the viscosity of a 4 wt % aqueous solution of the acetoacetylated PVA-based resin is typically from 1.5 mPa·s to 100 mPa·s, preferably from 4 mPa·s to 80 mPa·s, more preferably from 5 mPa·s to 70 mPa·s.

In the present disclosure, the viscosity of the 4 wt % aqueous solution of the acetoacetylated PVA-based resin is a viscosity at 20° C. measured in conformity with JIS K 6726.

In addition, the saponification degree of the acetoacetylated PVA-based resin to be used in the present disclosure is typically from 80 mol % to 100 mol %, and a resin having a saponification degree of preferably from 85 mol % to 99.9 mol %, particularly preferably from 90 mol % to 99.8 mol % is used.

In the present disclosure, the saponification degree of the acetoacetylated PVA-based resin is measured in conformity with JIS K 6726.

The shape of the acetoacetylated PVA-based resin is typically, for example, powder, a granule, or a pellet, and the powder or the granule that easily dissolves in water is preferred. In addition, the average particle diameter of the acetoacetylated PVA-based resin is typically from 100 μm to 1,000 μm, preferably from 150 μm to 500 μm, particularly preferably from 200 μm to 400 μm. When the average particle diameter is excessively small, it tends to be difficult to handle the resin owing to, for example, its scattering, and when the average particle diameter is excessively large, a reaction between the resin and diketene tends to be nonuniform.

The average particle diameter is measured by sieving, and the particle diameter at which the cumulative value of a particle size distribution becomes 50 wt % is defined as the average particle diameter.

The acetoacetylated PVA-based resin after its production typically contains small amounts of an alcohol and moisture. That is, the alcohol is, for example, methanol or ethanol used in the washing or saponification of the resin, and in ordinary cases, the resin contains a certain amount of the alcohol and water is present in a small amount in the resin. The content of such alcohol is typically from 0.1 wt % to 10 wt %. In addition, a moisture amount is typically 5 wt % or less, preferably 3 wt % or less. In the case where such moisture amount is excessively large, the following tendency is observed: even when moisture is blocked with the water vapor barrier layer, the effects of the present application are not obtained.

In addition, the content of an acetoacetyl group (hereinafter abbreviated as "acetoacetylation degree") in the acetoacetylated PVA-based resin is typically from 0.1 mol % to 20 mol %, and a resin having an acetoacetylation degree of preferably from 0.2 mol % to 15 mol %, particularly preferably from 0.3 mol % to 10 mol % is generally widely used.

In addition, in the acetoacetylated PVA-based resin to be used in the present disclosure, part of an acetate of an alkali metal (derived mainly from, for example, a product of a reaction between an alkali metal hydroxide used as a saponification catalyst and acetic acid produced by the saponification of polyvinyl acetate), such as sodium acetate, an organic acid (derived from, for example, an organic acid absorbed in the PVA-based resin at the time of its reaction with diketene in the introduction of an acetoacetic acid ester group into the PVA-based resin), such as acetic acid, or an organic solvent (derived from, for example, the reaction solvent of the PVA-based resin or a washing solvent at the time of the production of the acetoacetylated PVA-based resin), such as methanol or methyl acetate, the acetate, the organic acid, or the organic solvent being used or produced as a by-product in a production process for the resin, may remain.

Storage Method

A method of storing an active hydrogen-containing PVA-based resin serving as an example of a form of use of the packaging bag is described. For example, a particulate matter of the active hydrogen-containing PVA-based resin is loaded from the opening portion of the packaging bag and hermetically sealed therein, and then the opening portion is heat-sealed. A dry inert gas (e.g., a nitrogen gas) is preferably used as a carrier gas at the time of the loading. In addition, when kraft paper is arranged as the sheath of the packaging bag, the resin is typically stored by sewing the opening portion with a sewing machine to seal the bag and then folding the opening portion. Such packaging bag in which the particulate matter of the active hydrogen-containing PVA-based resin is loaded and hermetically sealed is subjected to, for example, various transportation means.

EXAMPLES

Now, the present disclosure is described by way of Examples, but the present disclosure is not limited to the description of Examples without departing from the gist of the present disclosure.

In Examples, "part(s)" and "%" are by weight.

Example 1

Acetoacetylated PVA-Based Resin 1

A powdery acetoacetylated PVA-based resin 1 having a saponification degree of 98 mol %, an average polymerization degree of 2,400, an average particle diameter of 400 µm, an acetoacetylation degree of 3.5 mol %, and a content of volatile components (main component: methanol) of 2.3% was used.

Production of Packaging Bag

Two films of multilayer structures each having a polyethylene terephthalate film (protective film layer, thickness: 12 µm), aluminum foil (water vapor barrier layer, thickness: 7 µm), a polyamide film (substrate film layer, thickness: 15 µm), and a low-density polyethylene film (substrate film layer, thickness: 50 µm) were prepared as multilayer structure films. Next, the two multilayer structure films were superimposed on each other so that the protective film layers were positioned on an outer side, and three sides except one side serving as an opening portion were heat-sealed so that a size measuring 160 mm long by 110 mm wide was obtained. Thus, a packaging bag was produced. The water vapor permeability of the produced packaging bag was 0 g/m$^2$/day (40° C., 90% RH). As described in the foregoing, the water vapor permeability is a value at 40° C. and 90% RH measured in conformity with JIS Z 0208. Measurement was hereinafter similarly performed.

Long-Term Storage

100 Grams of the powdery acetoacetylated PVA-based resin 1 was loaded from the opening portion of the packaging bag, and was then hermetically sealed therein by heat-sealing the upper portion of the opening. Then, the packaging bag was stored under an environment of 40° C. and 75% RH for 60 days.

Measurement of Viscosity

The viscosity of a 4% aqueous solution of the powdery acetoacetylated PVA-based resin corresponding to a storage period of 0 days at 20° C. (initial value), and the viscosity of a 4% aqueous solution of the resin after the 60 days of storage at 20° C. were measured in conformity with JIS K 6726.

Measurement of Insoluble Matter Content

About 20 g (S g) of each of the powdery acetoacetylated PVA-based resin corresponding to a storage period of 0 days (initial value) and the powdery acetoacetylated PVA-based resin after the storage (after 60 days) was sufficiently dispersed in 200 ml of ion-exchanged water in an Erlenmeyer flask, and then the powdery acetoacetylated PVA-based resin was dissolved by stirring the resultant at 95° C. for 1 hour. Then, the solution was filtered with a metal mesh (A g) having an aperture of 44 µm that had been weighed in advance. Further, an insoluble matter in the Erlenmeyer flask was completely transferred onto the metal mesh and washed with 2 L of warm water at from 80° C. to 90° C. After that, the metal mesh having the insoluble matter placed thereon was dried with an electric constant-temperature dryer at 105° C. for 2 hours, and then its weight (B g) was measured. An insoluble matter content (%) was determined from the following expression (1).

$$[(B-A)/S] \times 100 \quad (1)$$

Example 2

Evaluations were performed in the same manner as in Example 1 except that the storage period was changed to 90 days. The results are shown in Table 1 below.

Example 3

Evaluations were performed in the same manner as in Example 1 except that the storage period was changed to 140 days. The results are shown in Table 1 below.

Comparative Example 1

A packaging bag was formed only of one water vapor barrier layer (single-layer structure), and low-density polyethylene (thickness: 50 µm, MFR: 0.9 g/10 min, density: 0.924 g/cm$^3$) was used as a water vapor barrier layer-forming material. The water vapor permeability of the low-density polyethylene was 18 g/m$^2$/day (40° C., 90% RH). Then, the packaging bag was produced in the same manner as in Example 1, and evaluations were performed in the same manner as in Example 1 (storage period: 60 days). The results are shown in Table 1 below.

Comparative Example 2

Evaluations were performed in the same manner as in Comparative Example 1 except that in Comparative Example 1, the storage period was changed to 90 days. The results are shown in Table 1 below.

TABLE 1

|  | Water vapor permeability of packaging bag (g/m$^2$/day) | Storage period (day(s)) | Viscosity (mPa · s) | Insoluble matter content (%) |
| --- | --- | --- | --- | --- |
| Initial value | — | 0 | 56 | Less than 0.01 |
| Example 1 | 0 | 60 | 62 | Less than 0.01 |
| Example 2 | 0 | 90 | 68 | 0.02 |
| Example 3 | 0 | 140 | 72 | 0.06 |
| Comparative Example 1 | 18 | 60 | 86 | 0.1 or more |
| Comparative Example 2 | 18 | 90 | 100 or more | Unmeasurable |

As is apparent from Table 1 above, in Examples 1 and 2 in each of which the packaging bag was used, even after the 60 days of storage and after the 90 days of storage, the viscosities of the aqueous solutions were 62 mPa·s and 68 mPa·s, respectively, and the insoluble matter contents were less than 0.01% and 0.02%, respectively. Further, in Example 3, even after a lapse of 140 days, the viscosity of the aqueous solution was reduced to about 1.3 times as high as the initial value, and the insoluble matter content was reduced to less than 0.1%. Meanwhile, in Comparative Example 1 in which the resin was stored with the packaging bag having a water vapor permeability exceeding a value specified in the present disclosure, after the 60 days of storage, the viscosity of the aqueous solution exceeded 85 mPa·s, and the insoluble matter content was 0.1% or more. In addition, in Comparative Example 2 in which the resin was stored for 90 days, the viscosity was 100 mPa·s or more, and the insoluble matter content was unmeasurable.

Example 4

Acetoacetylated PVA-Based Resin 2

A powdery acetoacetylated PVA-based resin 2 having a saponification degree of 98 mol %, an average polymerization degree of 2,400, an average particle diameter of 400 μm, an acetoacetylation degree of 3.5 mol %, and a content of volatile components (main component: methanol) of 2.6% was used.

The powdery acetoacetylated PVA-based resin 2 was packaged with the same packaging bag as that of Example 1 by loading and hermetically sealing the resin in the bag, and then evaluations were performed in the same manner as in Example 1 (storage period: 60 days). The results are shown in Table 2 below.

Example 5

Evaluations were performed in the same manner as in Example 1 except that in Example 4, the storage period was changed to 90 days. The results are shown in Table 2 below.

Example 6

In Example 4, a packaging bag was formed only of a water vapor barrier layer of a two-layer structure (thickness: 100 μm) obtained by stacking two low-density polyethylene films (thickness: 50 μm, MFR: 0.9 g/10 min, density: 0.924 g/cm$^3$). The water vapor permeability of the packaging bag of a two-layer structure (only the water vapor barrier layer) measured in the same manner as in Example 1 was 9 g/m$^2$/day (40° C., 90% RH). Then, the packaging bag was produced in the same manner as in Example 1, and evaluations were performed in the same manner as in Example 1 (storage period: 60 days). The results are shown in Table 2 below.

Example 7

Evaluations were performed in the same manner as in Example 1 except that in Example 6, the storage period was changed to 90 days. The results are shown in Table 2 below.

Example 8

A packaging bag was formed only of a water vapor barrier layer of a three-layer structure (thickness: 150 μm) obtained by stacking three low-density polyethylene films (thickness: 50 μm, MFR: 0.9 g/10 min, density: 0.924 g/cm$^3$). The water vapor permeability of the packaging bag of a three-layer structure (only the water vapor barrier layer) measured in the same manner as in Example 1 was 6 g/m$^2$/day (40° C., 90% RH). Then, the packaging bag was produced in the same manner as in Example 1, and evaluations were performed with the acetoacetylated PVA-based resin 2 in the same manner as in Example 1 (storage period: 60 days). The results are shown in Table 2.

Example 9

Evaluations were performed in the same manner as in Example 1 except that in Example 8, the storage period was changed to 90 days. The results are shown in Table 2 below.

Comparative Example 3

A packaging bag was formed only of a water vapor barrier layer of a single-layer structure (thickness: 50 μm) using a low-density polyethylene film (thickness: 50 μm, MER: 0.9 g/10 min, density: 0.924 g/cm$^3$). The water vapor permeability of the packaging bag of a single-layer structure (only the water vapor barrier layer) measured in the same manner as in Example 1 was 18 g/m$^2$/day (40° C., 90% RH). Then, the packaging bag was produced in the same manner as in Example 1, and evaluations were performed with the acetoacetylated PVA-based resin 2 in the same manner as in Example 1 (storage period: 60 days). The results are shown in Table 2.

Comparative Example 4

Evaluations were performed in the same manner as in Example 1 except that in Comparative Example 3, the storage period was changed to 90 days. The results are shown in Table 2 below.

Reference Example 1

In Comparative Example 3, a viscosity was measured while the acetoacetylated PVA-based resin 2 was changed to unmodified PVA (saponification degree: 99 mol %, polymerization degree: 2,600, viscosity of a 4% aqueous solution: 64.3 mPa·s), and the storage period was changed to 1,110 days. The result is shown in Table 2 below.

TABLE 2

| | Water vapor permeability of packaging bag (g/m$^2$/day) | Storage period (day(s)) | Viscosity (mPa · S) | Insoluble matter content (%) |
|---|---|---|---|---|
| Initial value | — | 0 | 54.1 | 0.008 |
| Example 4 | 0 | 60 | 65.4 | 0.005 |
| Example 5 | 0 | 90 | 70.5 | 0.016 |
| Example 6 | 9 | 60 | 69.2 | 0.025 |
| Example 7 | 9 | 90 | 90.5 | 0.079 |
| Example 8 | 6 | 60 | 66.0 | 0.016 |
| Example 9 | 6 | 90 | 81.8 | 0.021 |
| Comparative Example 3 | 18 | 60 | 77.8 | 0.075 |
| Comparative Example 4 | 18 | 90 | Unmeasurable | Unmeasurable |
| Reference Example 1 | 18 | 1,110 | 64.7 | — |

As is apparent from Table 2 above, in each of Examples in each of which the packaging bag was used, even after the 60 days of storage, the viscosity of the aqueous solution was less than 70 mPa·s, and the insoluble matter content was 0.025% or less. Meanwhile, in Comparative Example 3 in which the resin was stored with the packaging bag having a water vapor permeability exceeding a value specified in the present disclosure, the viscosity of the aqueous solution exceeded 75 mPa·s after the 60 days of storage, and the insoluble matter content was 0.075% after the 60 days of storage. In addition, in Comparative Example 4 in which the resin was stored for 90 days, both the viscosity and the insoluble matter content were unmeasurable.

In addition, as Reference Example 1, the unmodified PVA free of active hydrogen was stored with the same packaging bag as that of Comparative Example 3. However, even after a lapse of 1,000 days or more, no large change in viscosity occurred, i.e., the PVA did not alter.

In Examples described above, specific embodiments in the present disclosure have been described. However, Examples described above are merely illustrative and should not be construed as being limitative. Various modifications apparent to a person skilled in the art are meant to be within the scope of the present disclosure.

An active hydrogen-containing PVA-based resin stored and transported with the packaging bag, e.g., an acetoacetylated PVA-based resin is excellent in storage stability. Accordingly, when the resin is turned into an aqueous solution, an insoluble matter content is small and hence the resin is useful in development into various applications.

The invention claimed is:

1. A method comprising packaging a polyvinyl alcohol-based resin that contains a modified group having active hydrogen within a packaging bag;
    wherein the packaging bag comprises a film containing a low-density polyethylene and having a water vapor permeability of 10 $g/m^2/day$ or less; and
    wherein the polyvinyl alcohol-based resin that contains a modified group having active hydrogen comprises a powdery matter having an average particle diameter of from 100 μm to 1,000 μm.

2. The method according to claim 1, wherein the packaging bag includes only a water vapor barrier layer having a water vapor permeability of 10 $g/m^2/day$ or less.

3. The method according to claim 1, wherein the packaging bag includes a multilayer structure film formed of a substrate film layer, a water vapor barrier layer, and a protective film layer.

4. The method according to claim 1, wherein the packaging bag has a thickness of from 10 μm to 450 μm.

5. The method according to claim 1, wherein the polyvinyl alcohol-based resin that contains a modified group having active hydrogen has an average polymerization degree in conformity with JIS K 6726 of from 200 to 4,000.

6. The method according to claim 1, wherein the polyvinyl alcohol-based resin that contains a modified group having active hydrogen has a saponification degree in conformity with JIS K 6726 of from 80 mol % to 100 mol %.

7. The method according to claim 1, wherein the polyvinyl alcohol-based resin that contains a modified group having active hydrogen comprises an acetoacetyl group-containing polyvinyl alcohol-based resin.

8. The method according to claim 1, wherein the packaging bag further comprises kraft paper, the kraft paper being outside the film.

9. The method according to claim 1, wherein the packaging bag is sheathed with a sheath bag comprising kraft paper.

10. A method of storing a polyvinyl alcohol-based resin that contains a modified group having active hydrogen, wherein the method comprises hermetically sealing a powdery matter of the polyvinyl alcohol-based resin that contains a modified group having active hydrogen with a packaging bag including a film containing a low-density polyethylene having a water vapor permeability of 10 $g/m^2/day$ or less; and
    wherein the powdery matter of the polyvinyl alcohol-based resin that contains a modified group having active hydrogen has an average particle diameter of from 100 μm to 1,000 μm.

11. The method according to claim 10, wherein the polyvinyl alcohol-based resin that contains a modified group having active hydrogen comprises an acetoacetyl group-containing polyvinyl alcohol-based resin.

12. The method according to claim 10, wherein the packaging bag includes only a water vapor barrier layer having a water vapor permeability of 10 $g/m^2/day$ or less.

13. The method according to claim 10, wherein the packaging bag includes a multilayer structure film formed of a substrate film layer, a water vapor barrier layer, and a protective film layer.

14. The method according to claim 10, wherein the packaging bag has a thickness of from 10 μm to 450 μm.

15. The method according to claim 10, wherein the polyvinyl alcohol-based resin that contains a modified group having active hydrogen has an average polymerization degree in conformity with JIS K 6726 of from 200 to 4,000.

16. The method according to claim 10, wherein the polyvinyl alcohol-based resin that contains a modified group having active hydrogen has a saponification degree in conformity with JIS K 6726 of from 80 mol % to 100 mol %.

17. The method according to claim 10, wherein the packaging bag further comprises kraft paper, the kraft paper being outside the film.

18. The method according to claim 10, wherein the packaging bag is sheathed with a sheath bag comprising kraft paper.

* * * * *